(12) United States Patent
Nainar et al.

(10) Patent No.: US 11,818,137 B2
(45) Date of Patent: Nov. 14, 2023

(54) CONTEXT-BASED SECURITY POLICY FOR DATA ACCESS AND VISIBILITY

(71) Applicant: Cisco Technology, Inc., San Jose, CA (US)

(72) Inventors: Nagendra Kumar Nainar, Morrisville, NC (US); Carlos M. Pignataro, Cary, NC (US); David John Zacks, Vancouver (CA); Thomas Szigeti, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 224 days.

(21) Appl. No.: 17/490,004

(22) Filed: Sep. 30, 2021

(65) Prior Publication Data
US 2023/0098281 A1    Mar. 30, 2023

(51) Int. Cl.
*H04L 29/06* (2006.01)
*H04L 9/40* (2022.01)
*G06V 40/16* (2022.01)

(52) U.S. Cl.
CPC .......... *H04L 63/104* (2013.01); *G06V 40/173* (2022.01); *H04L 63/20* (2013.01)

(58) Field of Classification Search
CPC ....... H04L 63/10; H04L 63/20; H04L 63/107; H04L 63/08; H04L 63/104; H04L 63/108
USPC ........................................................ 726/26
See application file for complete search history.

(56) References Cited

U.S. PATENT DOCUMENTS

| | | | |
|---|---|---|---|
| 9,367,677 B1 * | 6/2016 | Adhami | G06F 21/32 |
| 10,936,748 B1 * | 3/2021 | Hadsall | G06F 21/84 |
| 2018/0033171 A1 | 2/2018 | Rakshit | |
| 2019/0114060 A1 | 4/2019 | Resudek | |
| 2019/0340373 A1 | 11/2019 | Bulpin | |
| 2020/0104539 A1 | 4/2020 | Liu et al. | |

OTHER PUBLICATIONS

Ali, et al., "Protecting Mobile Users from Visual Privacy Attacks," UBICOMP '14 ADJUNCT, Sep. 2014, 4 pages.
Messmer, "Security startup gives PC shoulder surfers the cold shoulder," https://www.networkworld.com/article/2202799/security-startup-gives-pc-shoulder-surfers-the-cold-shoulder.html, Apr. 2011, 2 pages.

(Continued)

*Primary Examiner* — Longbit Chai
(74) *Attorney, Agent, or Firm* — Edell, Shapiro & Finnan, LLC

(57) ABSTRACT

A method, computer system, and computer program product are provided for controlling data access and visibility using a context-based security policy. A request from an endpoint device to receive data is received at a server, wherein the request includes one or more contextual attributes of the endpoint device including an identity of a user of the endpoint device. The one or more contextual attributes are processed to determine that the endpoint device is authorized to receive the data. A security policy is determined for the data based on the one or more contextual attributes. The data is transmitted, including the security policy, to the endpoint device, wherein the endpoint devices enforces the security policy to selectively permit access to the data by preventing the endpoint device from displaying the data to an unauthorized individual.

20 Claims, 8 Drawing Sheets

(56) References Cited

OTHER PUBLICATIONS

Lenovo Storyhub, "Lenovo Launches its Smartest Consumer Computers Yet," https://news.lenovo.com/pressroom/press-releases/lenovo-yoga-smartest-consumer-computers-yet/, Jan. 2019, 13 pages.
Almaula, "Protecting the login session from camera based shoulder surfing attacks," UC San Diego Electronic Theses and Dissertations, 2008, https://escholarship.org/uc/item/5d91n0jn, retrieved Sep. 2021, 87 pages.

\* cited by examiner

CONTEXT-BASED SECURITY POLICY FOR DATA ACCESS AND VISIBILITY

TECHNICAL FIELD

The present disclosure relates to securing data, and more specifically, to a context-based security policy for controlling data access and visibility.

BACKGROUND

As remote working grows in popularity, users are increasingly accessing sensitive data from offsite locations, such as their homes, coffee shops, libraries, airports, and the like. While the act of accessing data from public or other potentially insecure locations can expose the data to network security risks, the security of data can also be compromised when unauthorized individuals can visually observe displayed data. For example, "shoulder surfing" refers to a type of social engineering in which an unauthorized individual observes the display of another user's endpoint device. Confidential data can even be unintentionally viewed by others, especially when the data is displayed in public settings. Conventional approaches to securing displayed data employ a simple approach in which the data's visibility is tied to the presence of other observers; for example, a display may be blurred when another pair of eyes is detected in proximity to the display.

DESCRIPTION OF EXAMPLE EMBODIMENTS

Overview

Figure 1:
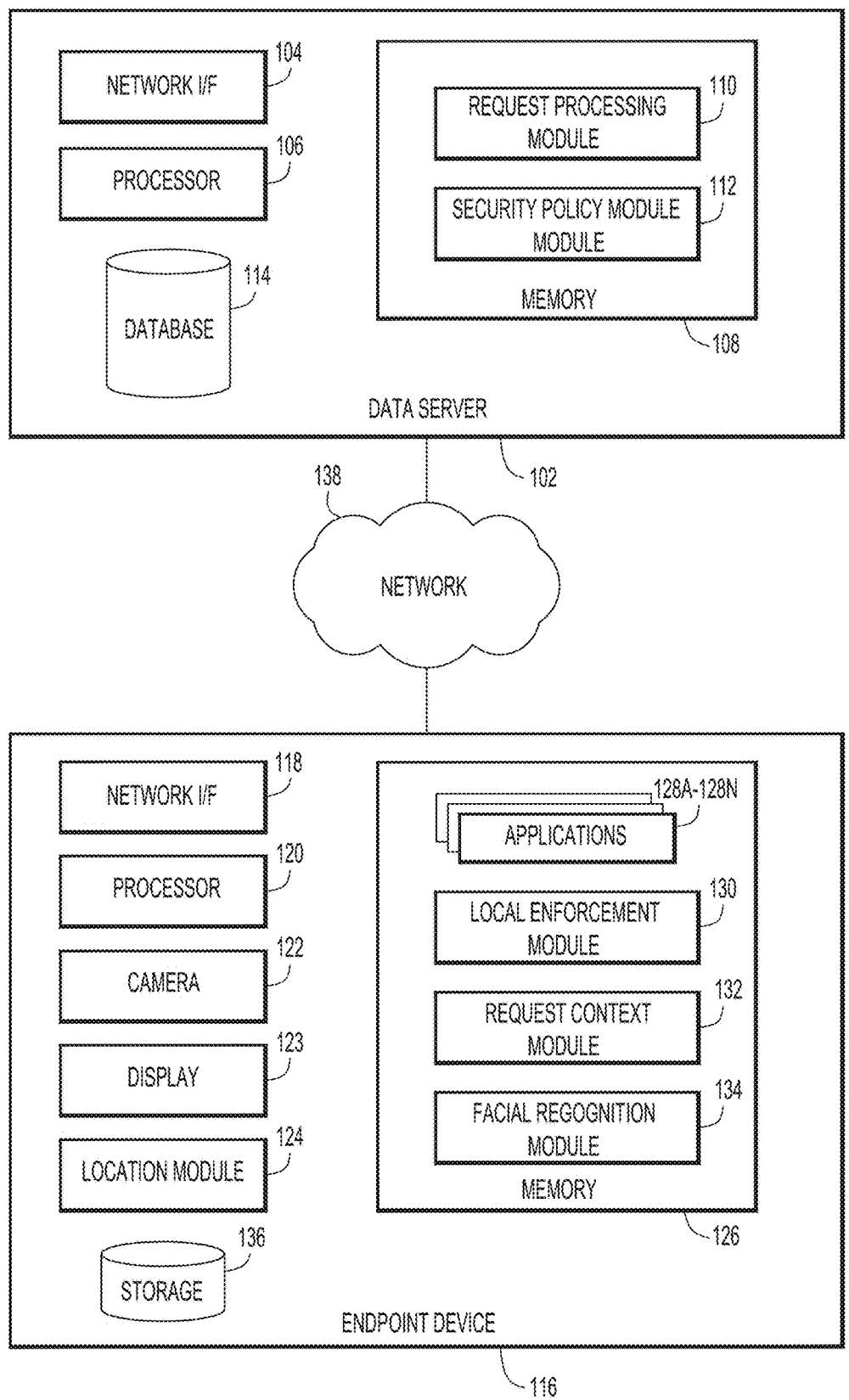
FIG. 1 is a block diagram depicting an environment for context-based securing of data, in accordance with an example embodiment.

According to one embodiment, techniques are provided for controlling data access and visibility using a context-based security policy. A request from an endpoint device to receive data is received at a server, wherein the request includes one or more contextual attributes of the endpoint device including an identity of a user of the endpoint device. The one or more contextual attributes are processed to determine that the endpoint device is authorized to receive the data. A security policy is determined for the data based on the one or more contextual attributes. The data is transmitted, including the security policy, to the endpoint device, wherein the endpoint devices enforces the security policy to selectively permit access to the data by preventing the endpoint device from displaying the data to an unauthorized individual.

Example Embodiments

Embodiments are provided for securing data, and more specifically, for a context-based security policy for controlling data access and visibility.

In the field of data security, many solutions exist for securing data from unauthorized access when the data is transmitted and/or stored. However, another threat to data security occurs when data is presented in a visual form on a display. A robust data security policy can protect data from network-based attacks, but cannot prevent sensitive information from being physically viewed by an unauthorized observer when the data is displayed e.g., in a public location.

While there exist conventional techniques for monitoring a visibility space (e.g., an area where humans can view at least a portion of a computing device's display) for the presence of other individuals, these solutions typically employ binary decision-making logic that blurs or hides data whenever the presence of multiple observers (including the user) is detected. For example, if two authorized coworkers are discussing a new idea in a conference room, and the first coworker attempts to show the second coworker a document on the first coworker's laptop, conventional approaches would blur the window due to the presence of the second coworker, thus requiring the feature to be temporarily disabled in order for the coworkers to collaborate. Other conventional solutions may attempt to solve this problem by employing location-based policies to prevent display of data. However, if a user relocates from an office to another location and resumes working offline, the location of the user's endpoint device may not update, and sensitive data that is stored in the endpoint device's cache may thus be displayed in an unsecured manner.

Accordingly, present embodiments employ a security policy that controls the visibility of data on a per-transaction basis given the context of the data transaction. Data can be classified on an application level, a session level, or a content level. Depending on the context, a real-time policy can then continuously perform facial recognition at a visibility space of an endpoint device to detect unauthorized observers, and hide displayed content accordingly. Furthermore, the context-based security policy can control the caching of data to prevent data from being stored in a cache and subsequently viewed in a second location.

Thus, present embodiments improve the technical field of data security by providing new techniques for securing data that consider the context of requests to access data in a highly-granular manner. The security policies not only apply to data that is being transmitted and/or stored, but also extend to data when the data is presented or viewed at an endpoint device. Furthermore, present embodiments provide the practical application of providing flexible security policies that can provide different security restrictions to the same data based on different contexts, such as the time of access, age of the data, specific client application used to access or view the data, and the like. Thus, each unique combination of contexts for a transaction can have its own tailored security policy for the access and visibility of data.

Additionally, instead of using a binary approach to blurring or hiding data, present embodiments can perform facial recognition to determine the identity of observers prior to determining whether or not to hide presented data.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for context-based securing of data, in accordance with an example embodiment. As depicted, environment 100 includes a data server 102, an endpoint device 116, and a (communication) network 138. It is to be understood that the functional division among components of environment 100 have been chosen for purposes of explaining various embodiments and is not to be construed as a limiting example.

Data server 102 includes a network interface (I/F) 104, at least one processor 106, memory 108, and a database 114. Memory 108 stores software instructions for a request processing module 110 and a security policy module 112. Data server 102 may include a rack-mounted server or any other programmable electronic device capable of executing computer readable program instructions. Network interface 104 may include one or more network interface cards, line cards, or similar devices, and enables components of data server 102 to send and receive data over a network, such as network 138. In general, data server 102 processes requests for data, authenticates requests, determines the context of requests, and applies security policies to requests. Data server 102 may include internal and external hardware components, as depicted and described in further detail with respect to FIG. 7.

Request processing module 110 and security policy module 112 may include one or more modules or units to perform various functions of the embodiments described below. Request processing module 110 and security policy module 112 may be implemented by any combination of any quantity of software and/or hardware modules or units, and may reside within memory 108 of data server 102 for execution by a processor, such as processor 106.

Request processing module 110 receives requests for data and processes the requests to identify the data that is being requested and/or to extract contextual metadata that captures the context of each request. In various embodiments, the context of a request may include the time at which a request was made, source network address (e.g., Internet Protocol (IP) address) of the request, any communication protocols and/or standards associated with a request, a location of a requesting device, the user associated with the endpoint device and/or the request, the user group or domain of the user's account, the client application in particular from which the request was issued, and/or any other contextual details that are descriptive of, or otherwise relate to, a request for data. Request processing module 110 may also retrieve the requested data by querying a database, such as database 114. Request processing module 110 can respond to a request by providing the requested data to the requesting entity, along with a security policy for the data (i.e., as determined by security policy module 112).

Security policy module 112 may process the contextual metadata of a request in combination with security metadata against a security policy. In particular, the requested data may itself include security metadata describing a security level and/or other security attributes of the data, and this security metadata is evaluated in combination with the contextual metadata of a particular request to determine a specific security policy to apply to the requested data.

Initially, security policy module 112 may authenticate the request using conventional or other techniques to authenticate the user who is requesting the data (e.g., to ensure that the user should have any access to data server 102 and its database 114). Thus, any requests not associated with a currently-authorized user can be ignored and/or flagged for subsequent security operations. Security policy module 112 may then evaluate the contextual metadata of a request and security metadata for the data being requested against a set of rules to select a particular security policy. The security policy may be selected based on certain conditions or criteria, or combinations thereof, being met.

The security policy can be applied to the data and enforced at a recipient endpoint device, such as endpoint device 116, in a variety of manners. In various embodiments, the security policy may define whether or not the requested data can be cached locally at endpoint device, the security policy may define particular individuals who are authorized to view the data, the security policy may define certain locations where the data can be accessed, viewed, and/or cached locally, the security policy may include a duration or amount of time after which certain aspects of the security policy expire or go into effect, and/or the security policy may control data access and/or visibility based on a combination of any of these or other control mechanisms. Security policy module 112 may apply the selected security policy to the data being requested, which may then be transmitted by request processing module 110 to the requesting device to fulfill a request. Security policy module 112 is depicted and described in further detail with respect to FIG. 2.

Database 114 may include any non-volatile storage media known in the art. For example, database 114 can be implemented with a tape library, optical library, one or more independent hard disk drives, or multiple hard disk drives in a redundant array of independent disks (RAID). Similarly, data in database 114 may conform to any suitable storage architecture known in the art, such as a file, a relational database, an object-oriented database, and/or one or more tables. Database 114 may store any data that is desired to be made network-accessible (e.g., via network 138), including sensitive or confidential data. Database 114 may store security metadata that is associated with particular data and that describes the security level and/or other security attributes of the data.

Endpoint device 116 includes a network interface (I/F) 118, at least one processor 120, a camera 122, a display 123, a location module 124, memory 126, and storage 136. Memory 126 stores software instructions for applications 128A-128N, a local enforcement module 130, a request context module 132, and a facial recognition module 134. Endpoint device 116 may include, for example, a laptop computer, a tablet computer, a netbook computer, a personal computer (PC), a desktop computer, a personal digital assistant (PDA), a smart phone, a thin client, or any programmable electronic device capable of executing computer readable program instructions. Network interface 118 may include one or more network interface cards, line cards, etc., and enables components of endpoint device 116 to send and receive data over a network, such as network 138. In general, endpoint device 116 accesses data hosted by data server 102 that is subject to security policies in accordance with present embodiments. Endpoint device 116 may include internal and external hardware components, as depicted and described in further detail with respect to FIG. 7.

Camera 122 may include any device for capturing image data, including still photography and/or video. Camera 122 may capture image data corresponding to a visible light spectrum and/or other spectra, such as infrared light. In various embodiments, camera 122 may be an integrated webcam, peripheral camera, forward-facing camera on a smartphone, and the like. Camera 122 may be positioned relative to display 123 of endpoint device 116 such that the field of view of camera 122 can capture any potential observers of display 123, including a user of endpoint device 116 and any other individuals within a visibility space of the endpoint device, which is an area in which an individual can to read or observe data being presented on at least a portion of display 123. In some embodiments, camera 122 may include one or more cameras that are positioned around a visibility space of endpoint device 116 and are in wired or wireless communication with endpoint device 116. For example, camera 122 may include one or more wireless cameras or closed-circuit television (CCTV) security cameras. In some embodiments, camera 122 may include a wide-angle lens.

Display 123 may include any electronic device capable of presenting information in a visual form. For example, display 123 may be a liquid crystal display (LCD), a cathode ray tube (CRT) display, a light-emitting diode (LED) display, an electronic ink display, and the like. Display 123 may present data to a user of endpoint device 116 in order for a user to read, edit, and/or otherwise interact with data that is presented in a visual form.

Location module 124 may determine a geographical location of endpoint device 116. In various embodiments, location module 124 determines the location of endpoint device 116 using the Global Positioning System (GPS) or a similar system, using electromagnetic-based or sound-based triangulation or trilateration techniques, and/or according to any other conventional or other techniques for obtaining a location. In some embodiments, the location of endpoint device 116 can be estimated based on a network address assigned to endpoint device 116; for example, an IP address can be used to approximate a geolocation.

Applications 128A-128N, local enforcement module 130, request context module 132, and facial recognition module 134 may include one or more modules or units to perform various functions of the embodiments described below. Applications 128A-128N, local enforcement module 130, request context module 132, and facial recognition module 134 may be implemented by any combination of any quantity of software and/or hardware modules or units, and may reside within memory 126 of endpoint device 116 for execution by a processor, such as processor 120.

Applications 128A-128N may include any client applications that can be used by a user of endpoint device 116 to access data, interpret data, process data, enter or generate data, edit data, and/or otherwise interact with data, including data obtained by data server 102 that is subject to a security policy. In various embodiments, applications 128A-128N can include word processors, slideshow or presentation applications, Portable Document Format (PDF) readers, web browsers, media players (e.g., audio and/or video players), and any other client applications that are suited to use data from data server 102 as input.

Local enforcement module 130 may enforce security policies that are applied to data obtained from data server 102. In order to enforce a security policy, local enforcement module 130 may integrate with other software of endpoint device 116, including operating system components and/or applications 128A-128N. Local enforcement module 130 may determine, based on a security policy that is applied to data, the conditions under which the data can be made visible on display 123, including temporal restrictions, geolocation restrictions, and observer-based restrictions (e.g., restrictions on who is authorized to view the data, as determined according to facial recognition techniques). Local enforcement module 130 may integrate with applications 128A-128N to selectively allow or deny applications 128A-128N the ability to store data in a local cache of endpoint device 116. In some embodiments, local enforcement module 130 may access a local data cache of endpoint device 116 in order to selectively purge data from the cache. In some embodiments, local enforcement module 130 may only permit the caching of data in certain geolocations of endpoint device 116, and in the event of a change in geolocation of endpoint device 116, local enforcement module 130 may require facial recognition to validate the user prior to refreshing of the cache.

In some embodiments, local enforcement module 130 selectively determines whether data can be displayed on display 123 based on facial recognition events. Local enforcement module 130 may integrate with an operating system of endpoint device 116 and/or with applications 128A-128N to determine which data in particular is being displayed at any given time at display 123. In some embodiments, local enforcement module 130 identifies a user interface that is being presented by display 123, determines which data is being presented by the user interface, and, based on the security policy that has been applied to that data, determines whether to permit or deny the display of the data. Moreover, local enforcement module 130 may allow or deny the display of data itself and/or the display of any content obtained as a result of processing the data, including text content, graphical content, audio content, and/or any other content. In various embodiments, local enforcement module 130 may prevent the display of data, including any results of processing said data, by deactivating display 123, by causing display 123 to display other content (e.g., by changing pixels to a particular color such as black or white), or by applying transforms to blur, pixelate, or otherwise alter or modify the content being displayed to render the content unintelligible. Local enforcement module 130 may prevent the display of data by performing actions to all displayed content, or may only apply the actions to a portion of the displayed content, such as a user interface element associated with the particular data whose display is being prevent.

Additionally or alternatively, local enforcement module 130 may allow or deny audio playback of audio that is based on data subject to a security policy by muting or pausing playback. Similarly to the display of data, local enforcement module 130 may disable playback of audio data according to the underlying data's security policy. For example, local enforcement module 130 may halt or mute audio that has been obtained as a result of processing a sensitive document using text-to-speech software.

Request context module 132 may collect contextual data associated with the context of a request and provide the contextual data to data server 102 so that an appropriate security policy can be applied to the response data. The contextual data may be bundled with, appended to, or otherwise included with the request, or may be transmitted separately to data server 102, along with an identifier indicating the request to which the contextual data applies. Request context module 132 may obtain data from any modules of endpoint device 116, including location module 124, applications 128A-128N, and other modules. In some embodiments, request context module 132 may include contextual data such as a location of endpoint device 116, a time of the request, the particular application of applications 128A-128N making the request, and the like. Request context module 132 may include the identities of any observers of display 123 (e.g., as determined via facial recognition module 134).

Facial recognition module 134 may analyze data obtained from camera 122 in order to identify any observers of display 123. In various embodiments, facial recognition module 134 may identify the presence of observers, may identify the identity (e.g., name) of observers, and/or may identify a number or count of observers. In some embodiments, facial recognition module 134 analyzes image data from camera 122 to extract facial features of any individuals who are present in the image data and, using conventional or other facial recognition techniques, facial recognition module 134 may obtain an identity of each individual. In some embodiments, some or all of the facial recognition processing is performed by a remote device or devices; for example, facial recognition module 134 may transmit extracted facial feature data to a server, such as data server 102, which processes the facial features to identify with particularity the individuals who are present at endpoint device 116 and provides back to facial recognition module 134 the identity of the individuals. In some embodiments, some or all of the facial recognition is performed locally at endpoint device 116. The security policy that is applied to data may include a list of authorized observers and their corresponding facial recognition data; facial recognition module 134 may use the approved observers' data to identify any observers, and in the event that there are observers whose identities cannot be resolved, display of data may be prevented.

Storage 136 may include any non-volatile storage media known in the art. For example, storage 136 can be implemented with a tape library, optical library, one or more independent hard disk drives, or multiple hard disk drives in a redundant array of independent disks (RAID). Similarly, data in storage 136 may conform to any suitable storage architecture known in the art, such as a file, a relational database, an object-oriented database, and/or one or more tables. Storage 136 may store cached data obtained from data server 102, results of processing data obtained from data server 102, security policy data, contextual data, and any other data relating to a context-based security policy in accordance with present embodiments.

Network 138 may include a local area network (LAN), a wide area network (WAN) such as the Internet, or a combination of the two, and includes wired, wireless, or fiber optic connections. In general, network 138 can be any combination of connections and protocols known in the art that will support communications between data server 102 and endpoint device 116 via their respective network interfaces in accordance with the described embodiments.

Figure 2:
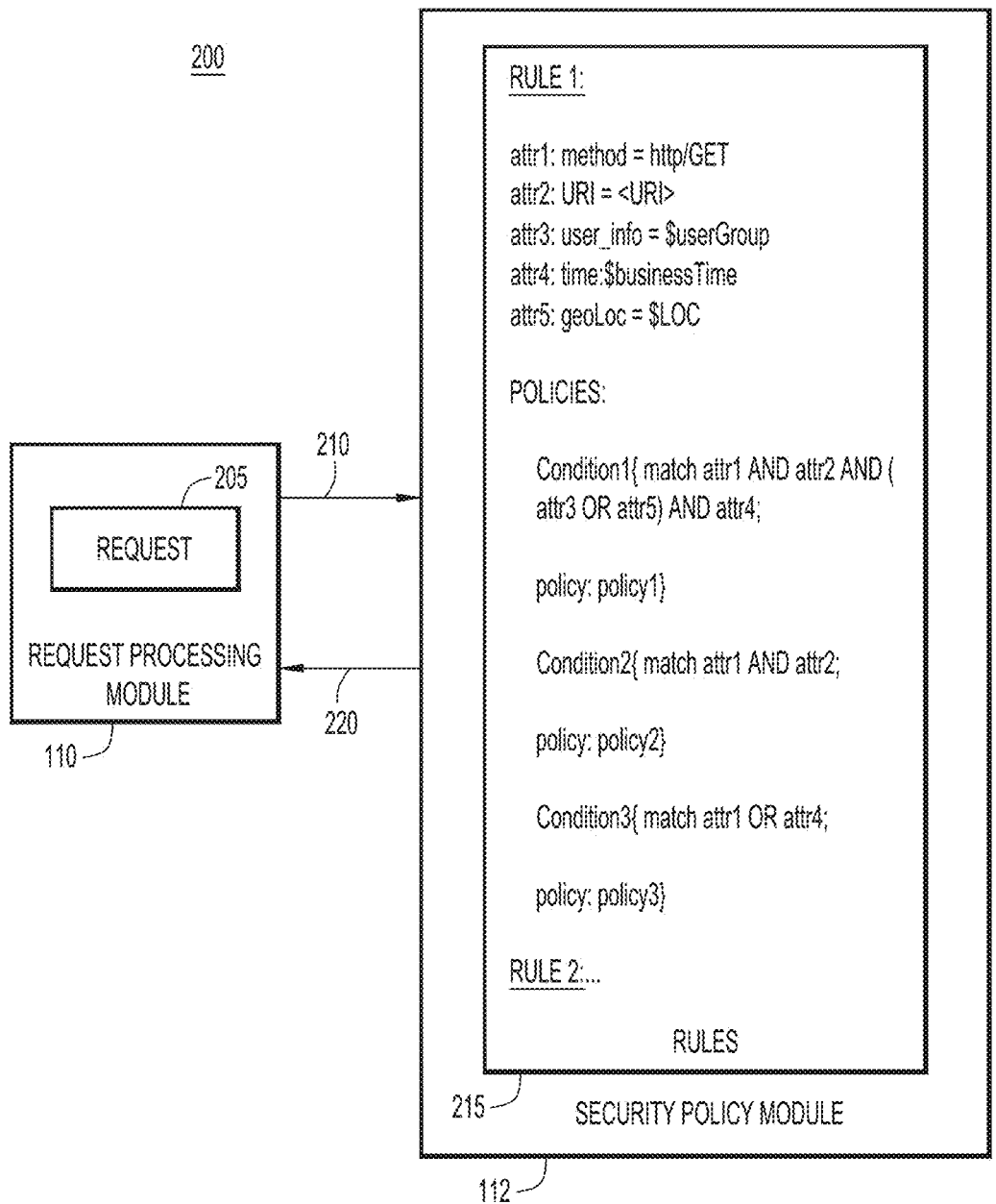
FIG. 2 is a block diagram depicting a system for processing a request for data to apply a security policy, in accordance with an example embodiment.

Referring now to FIG. 2, a block diagram is shown depicting a system 200 for processing a request for data to apply a security policy, in accordance with an example embodiment. As depicted, system 200 includes request processing module 110 and security policy module 112.

Initially, request processing module 110 may receive request 205 from a network-accessible location, such as endpoint device 116. Request processing module 110 may query a database, such as database 114, to obtain the data being requested as well as any security metadata that describes the security level and/or other security attributes of the data being requested. Request processing module 110 may extract contextual data from request 205, and may provide the security metadata and contextual metadata to security policy module 112 at operation 210.

Security policy module 112 may evaluate the security metadata and the contextual metadata against rules 215 to select a security policy for the requested data. For example, a first rule ("RULE 1") considers five different attributes ("attr1"-"attr5"): a request method or protocol (e.g., "http/GET"), a specific uniform resource identifier (URI) of the requested data (e.g., "<URI>"), information about the user placing the request (e.g., "$userGroup), information about the time of the request (e.g., "$businessTime"), and information about a geolocation of the requesting endpoint device (e.g., "$LOC"). Security policy module 112 may then process these attributes against various conditions of each rule (e.g., "Condition1"-"Condition3" of "RULE 1") to identify a specific security policy (e.g., "policy1", "policy2" or "policy3") to apply to the request. Rules 215 may include additional rules, enabling a fine-grained, context-based security policy to be obtained to data such that the same data may be secured differently based on different contexts, including the protocol of a request, location descriptor (e.g., URI) of the request, user group of the requesting user, time of request, geolocation, application making the request, and other contexts. Additionally or alternatively, rules 215 may include conditions that can be satisfied by security metadata of a request, so that different security policies can be applied to different requests based on the desired level of security of the data is (e.g., "highly classified," "top secret," "low-level clearance", etc.).

Once a security policy is determined, security policy module 112 provides the security policy back to request processing module 110 at operation 220, and request processing module 110 may then apply the security policy to the data requested by request 205 and transmit the data and security policy back to the requesting entity (e.g., endpoint device 116) to fulfill request 205.

Figure 3:
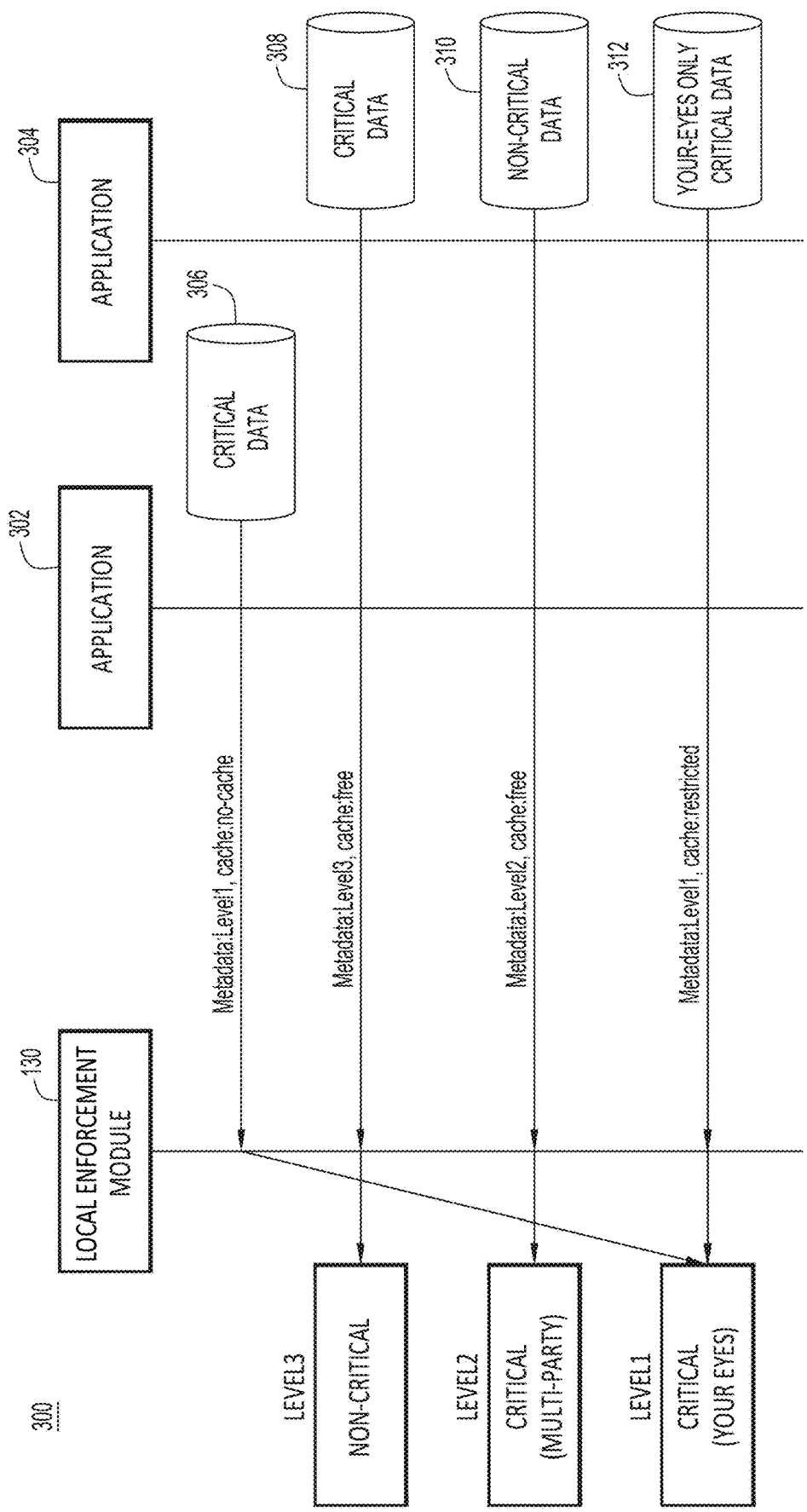
FIG. 3 is a block diagram depicting a system for applying a context-based security policy to requests having different contexts, in accordance with an example embodiment.

Referring now to FIG. 3, a block diagram is shown depicting a system 300 for applying a context-based security policy to requests having different contexts, in accordance with an example embodiment. As depicted, system 300 includes local enforcement module 130, applications 302 and 304, and four different objects of data requests that have varying levels of security: critical data 306, non-critical data 308, critical data 310, and yours-eyes only critical data 312.

As shown, application 302 begins to display critical data 306, which includes security metadata indicating that critical data 306 has a security level of "Level1" (which may correspond to a high level of security) and a cache setting of "no-cache" (which may indicate that local caching of critical data 306 is disallowed). Because of the security policy for critical data 306, which has a high security level, local enforcement module 130 may select a display setting of "Level1" that is critical or "your-eyes" only, and accordingly, local enforcement module 130 may terminate display of critical data 306 whenever any other observer is detected. All transactions involving application 302 may have this policy applied. For example, application 302 may be an application to open encrypted containers, and therefore, a security policy may dictate that any data handled by application 302 should only be viewed by the authorized user.

Application 304 is depicted as being used to display three items of data: non-critical data 308, critical data 310, and your-eyes only critical data 312. These items may be displayed simultaneously, or may be displayed at different times; if displayed simultaneously, and a security policy instructs local enforcement module 130 to blur a particular item, local enforcement module 130 may only blur a portion of a display that corresponds to that particular item of data, rather than the entire display. Application 304 may be an application that can be used for a variety of use-cases, and accordingly, may benefit from using different security policies for different data and/or contexts. For example, application 304 may be a word processing application.

Non-critical data 308 has a security level of "Level3" (which may indicate a relatively low level of security) and a cache setting of "free" (indicating that caching is allowed). Because of this low-level security policy, local enforcement module 130 may select a display setting of "Level3" that is non-critical, and thus does not require hiding of the data from other observers. This non-critical setting may be used for public data, such as an already-published press release, and the like.

Critical data 310 has a security level of "Level2" (which may indicate an intermediate level of security) and a cache setting of "free." Because of the intermediate security level, the security policy may cause local enforcement module 130 to select a display setting of "Level2" that is critical and allows multiple approved users to view the data.

Your-eyes only critical data 312 has a security level of "Level1" (which may indicate a highest level of security) and a cache setting of "restricted" (which may indicate that caching is only permitted at certain locations, such as an office). Because of the high security level, the security policy may cause local enforcement module 130 to select a display setting of "Level1" that is eyes-only critical and permits only the authorized user to observe the data. In some embodiments, a cache setting such as "restricted" may cause the local enforcement agent of an endpoint device to require continuous facial recognition that confirms (validate, etc.) the user's identity in order for the data to remain in a cache. In further embodiments, caching of data may no longer require confirmation of a user's identity after a predetermined amount of time has elapsed.

Figure 4A:
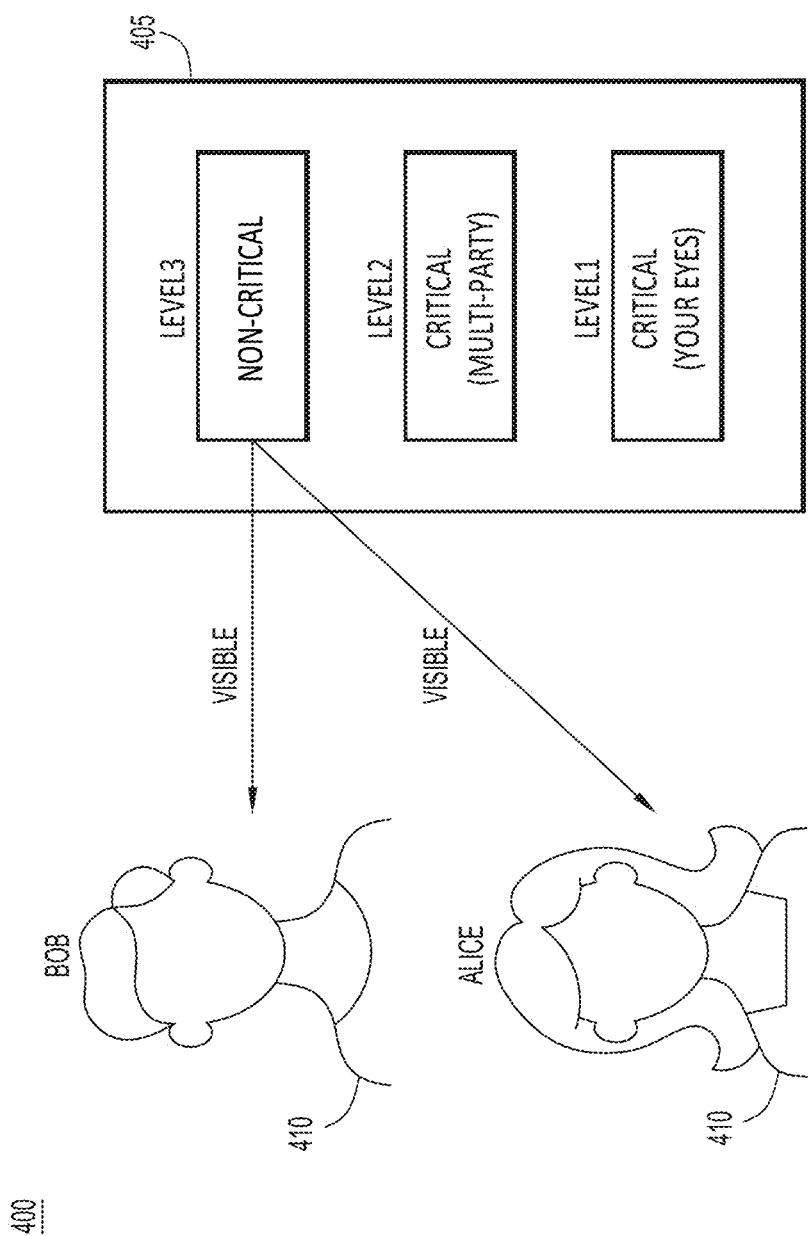
FIG. 4A is a diagram depicting an environment in which data is displayed, in accordance with an example embodiment.

Referring now to FIG. 4A, FIG. 4A is a diagram depicting an environment 400 in which data is displayed, in accordance with an example embodiment. As depicted, environment 400 includes an endpoint device's display 405 and two observers 410 (Bob and Alice). In the depicted example, Bob is an authorized user of the endpoint device, and Alice is not an authorized user. The data being presented on display 405 has a security policy of "Level3," which may indicate that the data is non-critical and can thus safely be viewed by unauthorized individuals (e.g., Alice). Hence, the data is permitted to be displayed in the presence of Alice.

Figure 4B:
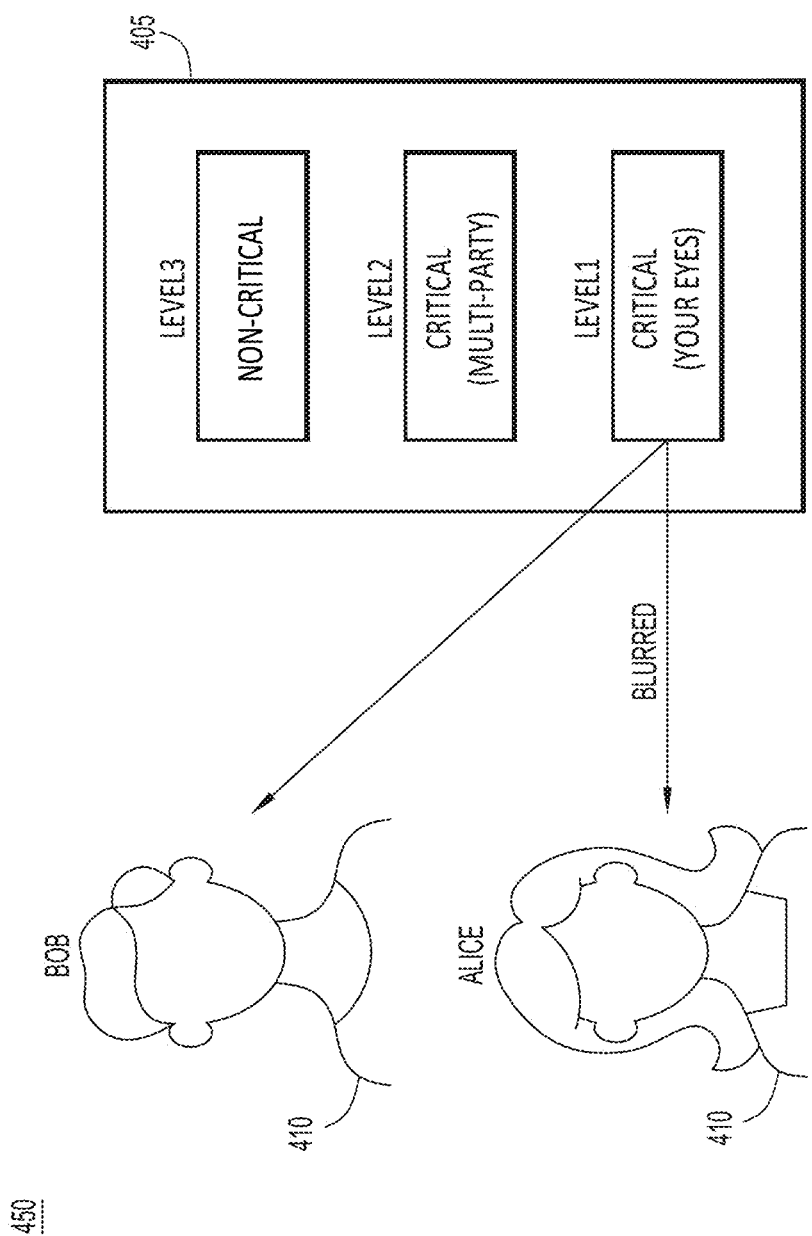
FIG. 4B is a diagram depicting an environment in which data is not displayed, in accordance with an example embodiment.

Referring now to FIG. 4B, FIG. 4B is a diagram depicting an environment 450 in which data is not displayed, in accordance with an example embodiment. Similarly to the environment 400 depicted in FIG. 4A, environment 450 of FIG. 4B also includes an endpoint device's display 405 and two observers 410 (Bob and Alice); likewise, Bob is an authorized user of the endpoint device, and Alice is not an authorized user. In contrast to the embodiment depicted in FIG. 4A, however, environment 450 of FIG. 4B depicts an embodiment in which the data being presented on display 405 has a security policy of "Level1," which may indicate that the data is highly sensitive, and a "your-eyes" only visibility setting is enforced. Accordingly, when any observer 410 (e.g., Alice) other than the authorized user (e.g., Bob), is detected, a user interface presented on the display is modified, e.g., blurred or otherwise altered to prevent the display of data.

Figure 5:
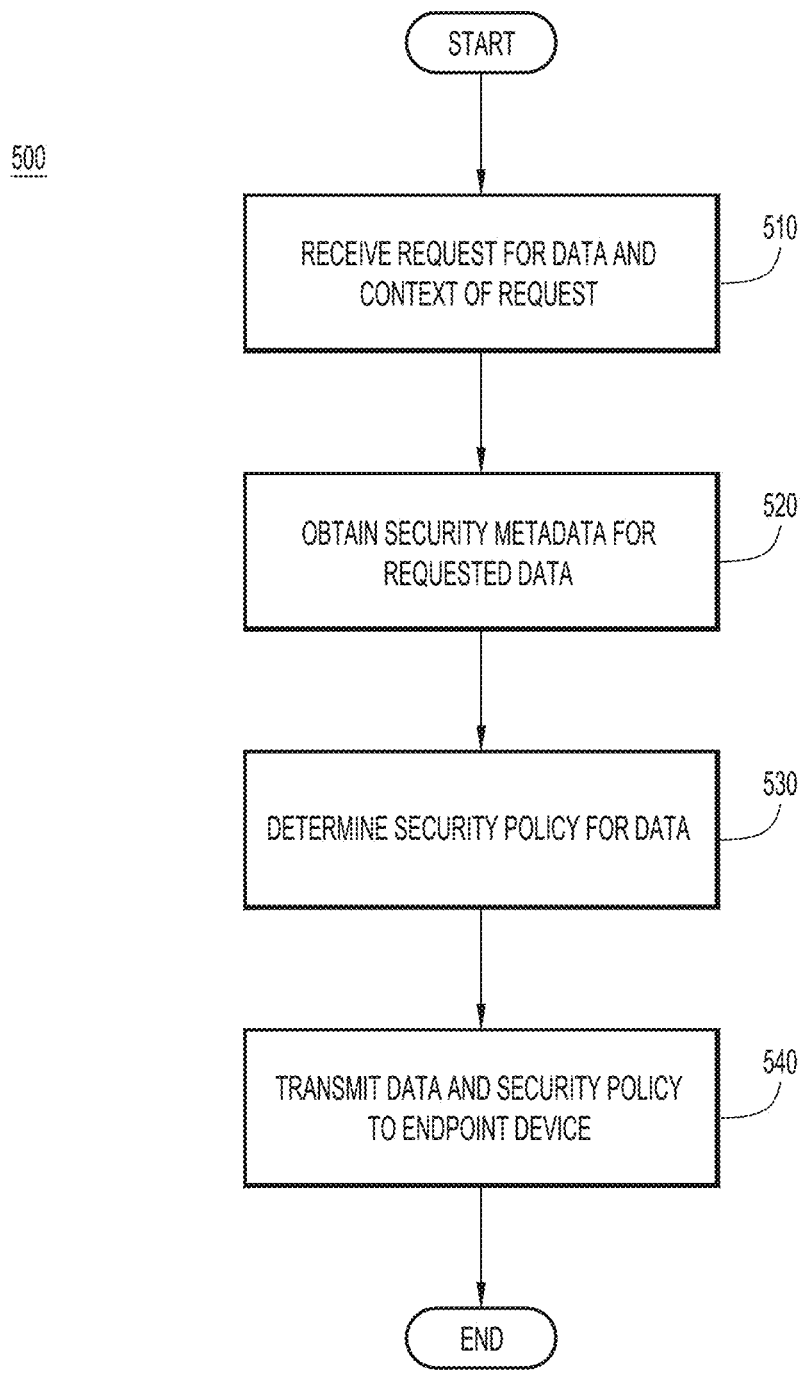
FIG. 5 is a flow chart depicting a method for context-based securing of data, in accordance with an example embodiment.

Referring now to FIG. 5, FIG. 5 is a flow chart depicting a method 500 for context-based securing of data, in accordance with an example embodiment.

A request for data is received, and a context of the request is determined at operation 510. The request may be placed by an endpoint device, such as endpoint device 116, and may be received by a server, such as data server 102. Initially, the server may authenticate the user and/or endpoint device associated with the request to validate the user and/or endpoint device as being approved to access data secured by the server. The request may be processed to extract contextual metadata, which can include a protocol of the request for the transfer of data (e.g., Hypertext Transfer Protocol (HTTP) GET or HEAD, etc., File Transfer Protocol (FTP), Simple Mail Transfer Protocol (SMTP), etc.), a time of the request, a geolocation of the requesting device, an identity of the requesting device and/or the user associated with the requesting device, a user group or domain of the user associated with the request, a URI specified in the request, and the like.

Security metadata for the requested data is obtained at operation 520. The requested data may be identified in a database (e.g., database 114) by performing a database query, by performing a lookup using a URI included in the request, and the like. Once the data is identified, security metadata that is associated with the data can be obtained. The security metadata may include a classification of a predetermined level of security of the data (e.g., low security, intermediate security, high security, etc.), and/or the security metadata may include other attributes, such as an indication of whether the data can be viewed by only the authorized user, by multiple authorized observers, or by multiple observers, including unauthorized observers. The security metadata can also include a time duration for certain features of the data, so that the level of security of data can change after a predetermined amount of time, at a predetermined time and date, and/or after occurrence of a specified event.

A security policy is determined for the data at operation 530. Prior to transmitting the data to the requesting endpoint device (e.g., endpoint device 116), a security policy is determined and applied to the data based on the contextual metadata associated with the request and/or based on the security metadata associated with the data being requested. A plurality of security policies can be defined based on unique combinations of contextual metadata and/or security metadata features, enabling a particular security policy to be selected based on a particular transaction's contextual metadata and security metadata meeting predetermined criteria.

The data and the security policy is transmitted to the endpoint device at operation 540. The selected security policy can be applied to the requested data and sent as a response to the requesting endpoint device. Thus, the requesting endpoint device's local enforcement agent (e.g., local enforcement module 130) can enforce the security policy as the data is accessed and presented using software of the endpoint device (e.g., applications 128A-128N).

Figure 6:
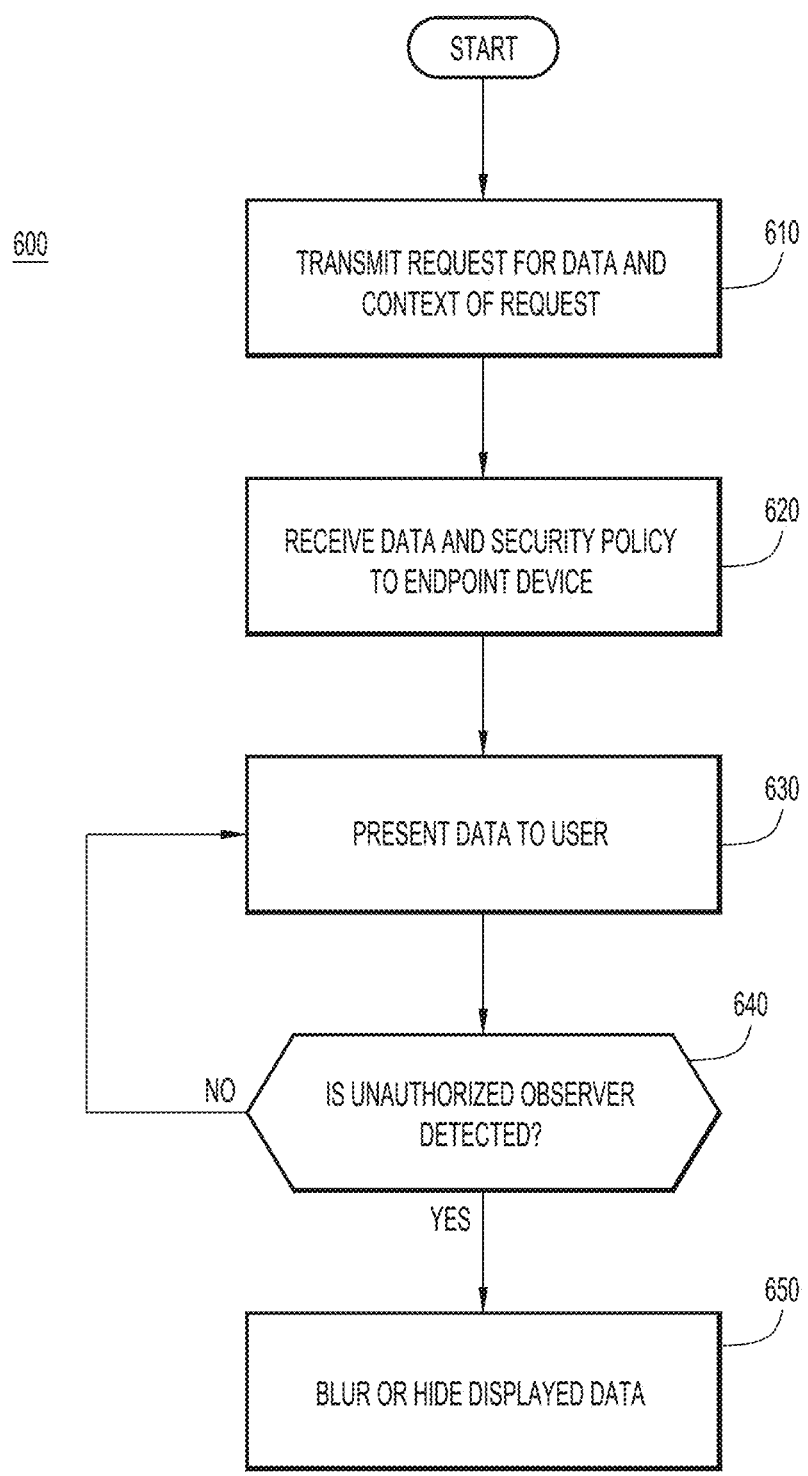
FIG. 6 is a flow chart depicting a method for client-side securing of data, in accordance with an example embodiment.

Referring now to FIG. 6, FIG. 6 is a flow chart depicting a method 600 for client-side securing of data, in accordance with an example embodiment.

A request for data is transmitted along with a context of the request at operation 610. The request may be initiated by a user interacting with an application of an endpoint device to cause the endpoint device to send the request. For example, a user may open a file using a client application. The request may be sent to a server that determines and applies a security policy to the data; in various embodiments, the server may host the data, or may obtain the requested data from one or more other network-accessible sources.

The requested data and a security policy for the data is received at the endpoint device at operation 620. In response to the request, the endpoint device may receive the requested data and a security policy that is applied to the data. The security policy may be analyzed by a local enforcement agent (e.g., local enforcement module 130), which can then continuously enforce the security policy as the user interacts with the data and/or as the user views the data on a display.

The data is presented to a user at operation 630. The requested data (and optionally, any additional data that is obtained as a result of processing the requested data) may be presented to a user at a display of an endpoint device. According to the security policy being enforced, the user may be validated using facial recognition techniques in order to permit display of the data.

Operation 640 determines whether an unauthorized observer is detected. An unauthorized user can include any unidentified observer, any additional observer beyond the user (e.g., any detected eyes), or an identified observer who is not permitted to view the data (e.g., a colleague of the user who works in a different department). If an unauthorized observer is detected, then method 600 causes the displayed data to be blurred or otherwise hidden from display at operation 650. Accordingly, the unauthorized viewing of potentially sensitive or confidential data can be prevented. If no unauthorized observers are detected, method 600 may continue to perform facial recognition at operation 640, thus monitoring for unauthorized observers for the duration that the user views the data.

Figure 7:
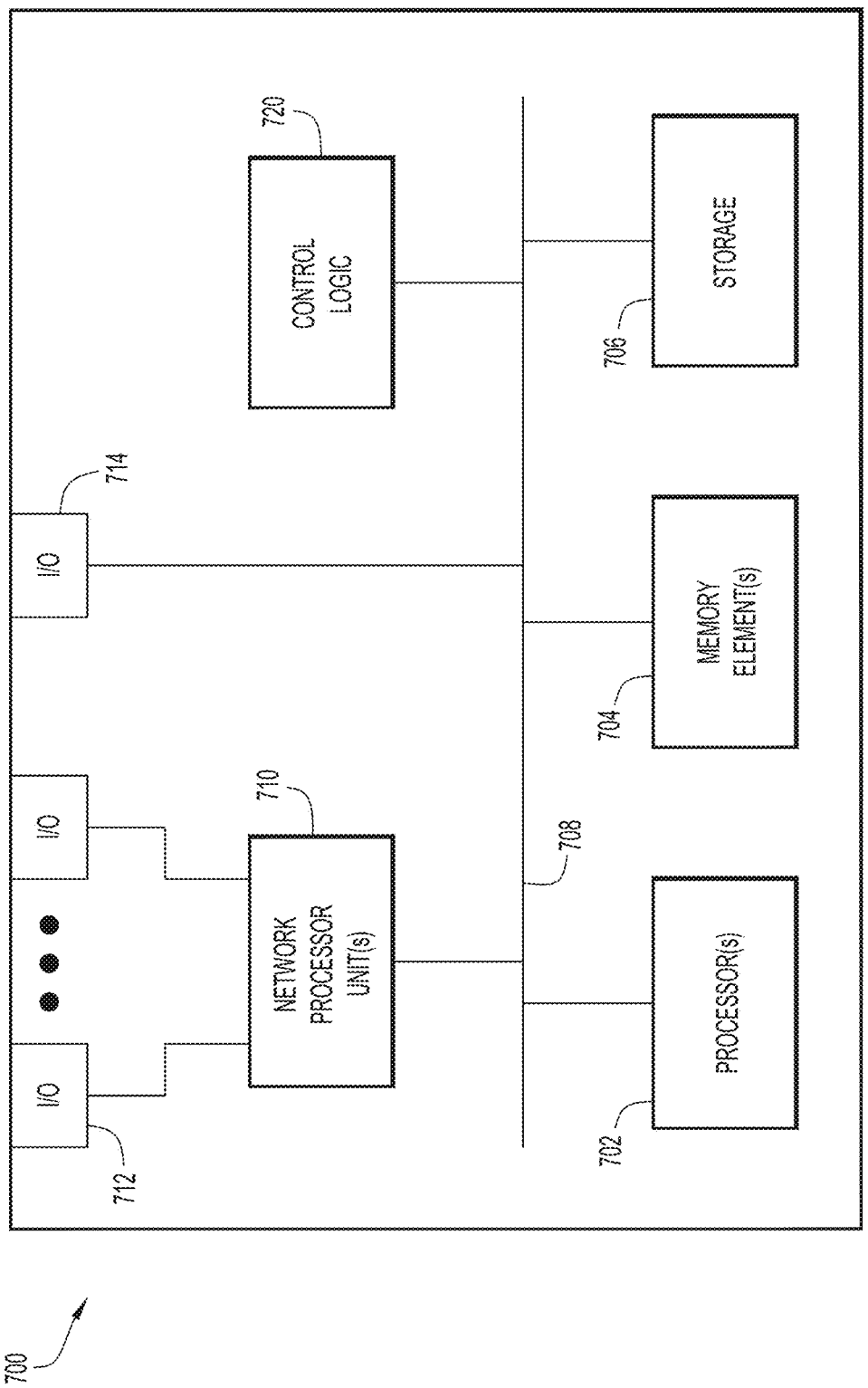
FIG. 7 is a block diagram depicting a computing device configured to apply a context-based security policy, in accordance with an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a computer-implemented method is provided comprising: receiving, at a server, a request from an endpoint device to receive data, wherein the request includes one or more contextual attributes of the endpoint device including an identity of a user of the endpoint device, processing the one or more contextual attributes to determine that the endpoint device is authorized to receive the data, determining a security policy for the data based on the one or more contextual attributes, and transmitting the data including the security policy to the endpoint device, wherein the endpoint devices enforces the security policy to selectively permit access to the data by preventing the endpoint device from displaying the data to an unauthorized individual.

In another form, preventing the endpoint device from displaying the data to an unauthorized user includes: identifying an unauthorized user using facial recognition, and modifying a user interface of the endpoint device in which the data is displayed to blur or hide the displayed data.

In another form, the security policy for the data is further determined based on metadata that is associated with the data, wherein the metadata indicates a security level of the data.

In another form, the one or more contextual attributes include a location of the endpoint device.

In another form, the security policy prevents unauthorized access to the data for a predetermined amount of time.

In another form, the security policy prevents local caching of the data at the endpoint device.

In another form, the data is cached locally based on the identity of the user being confirmed using facial recognition at the endpoint device.

In one form, a computer system is provided, comprising: one or more computer processors; one or more computer readable storage media; program instructions stored on the one or more computer readable storage media for execution by at least one of the one or more computer processors, the program instructions comprising instructions to: receive, at a server, a request from an endpoint device to receive data, wherein the request includes one or more contextual attributes of the endpoint device including an identity of a user of the endpoint device, process the one or more contextual attributes to determine that the endpoint device is authorized to receive the data, determine a security policy for the data based on the one or more contextual attributes, and transmit the data including the security policy to the endpoint device, wherein the endpoint devices enforces the security policy to selectively permit access to the data by preventing the endpoint device from displaying the data to an unauthorized individual.

In one form, one or more computer readable storage media is provided, the one or more computer readable storage media collectively having program instructions embodied therewith, the program instructions executable by a computer to cause the computer to: receive, at a server, a request from an endpoint device to receive data, wherein the request includes one or more contextual attributes of the endpoint device including an identity of a user of the endpoint device, process the one or more contextual attributes to determine that the endpoint device is authorized to receive the data, determine a security policy for the data based on the one or more contextual attributes, and transmit the data including the security policy to the endpoint device, wherein the endpoint devices enforces the security policy to selectively permit access to the data by preventing the endpoint device from displaying the data to an unauthorized individual.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for secure data access comprising:
    receiving, at a server, a request from an endpoint device for requested data, wherein the request includes one or more contextual attributes of the endpoint device including an identity of a user of the endpoint device;
    processing the one or more contextual attributes and authenticating the identity of the user to determine that the endpoint device is authorized to receive the requested data;
    determining a security policy for the requested data based on the one or more contextual attributes; and
    transmitting, by the server, the requested data including the determined security policy to the endpoint device, wherein responsive to receiving the requested data to obtain received data, the endpoint device enforces the security policy associated with the authenticated user to selectively permit access to the received data by (i) preventing the endpoint device from displaying the received data to an unauthorized individual and (ii) locally caching the received data on the endpoint device.

2. The computer-implemented method of claim 1, wherein preventing the endpoint device from displaying the received data to an unauthorized user comprises:
    identifying the unauthorized user using facial recognition; and
    modifying a user interface of the endpoint device in which the received data is displayed to blur or hide the data that is displayed.

3. The computer-implemented method of claim 1, wherein the security policy for the received data is further determined based on metadata that is associated with the received data, wherein the metadata indicates a security level of the received data.

4. The computer-implemented method of claim 1, wherein the one or more contextual attributes include a location of the endpoint device.

5. The computer-implemented method of claim 1, wherein the security policy prevents unauthorized access to the received data for a predetermined amount of time.

6. The computer-implemented method of claim 1, wherein the data is cached locally based on the identity of the user being confirmed using facial recognition at the endpoint device.

7. The computer-implemented method of claim 1, wherein the received data includes audio data, and wherein selectively permitting access to the received data further includes disabling playback of the audio data.

8. An apparatus for secure data access comprising:
    one or more computer hardware processors;
    a network interface configured to enable network communications; and
    one or more computer readable storage media;
    program instructions stored on the one or more computer readable storage media for execution by at least one of the one or more computer hardware processors, the program instructions comprising instructions to:
    receive, at a server, a request from an endpoint device for requested data, wherein the request includes one or more contextual attributes of the endpoint device including an identity of a user of the endpoint device;
    process the one or more contextual attributes and authenticating the identity of the user to determine that the endpoint device is authorized to receive the requested data;
    determine a security policy for the requested data based on the one or more contextual attributes; and
    transmit, by the server, the requested data including the determined security policy to the endpoint device, wherein responsive to receiving the requested data, the endpoint device enforces the security policy to selectively permit access to the received data by La preventing the endpoint device from displaying the received data to an unauthorized individual and (ii) locally caching the received data on the endpoint device.

9. The apparatus of claim 8, wherein the program instructions to prevent the endpoint device from displaying the received data to an unauthorized user comprise instructions to:
    identify the unauthorized user using facial recognition; and
    modify a user interface of the endpoint device in which the received data is displayed to blur or hide the data that is displayed.

10. The apparatus of claim 8, wherein the security policy for the received data is further determined based on metadata that is associated with the received data, wherein the metadata indicates a security level of the received data.

11. The apparatus of claim 8, wherein the one or more contextual attributes include a location of the endpoint device.

12. The apparatus of claim 8, wherein the security policy prevents unauthorized access to the received data for a predetermined amount of time.

13. The apparatus of claim 8, wherein the data is cached locally based on the identity of the user being confirmed using facial recognition at the endpoint device.

14. The apparatus of claim 8, wherein the received data includes audio data, and wherein selectively permitting access to the received data further includes disabling playback of the audio data.

15. One or more non-transitory computer readable storage media collectively having program instructions embodied therewith for secure data access, the program instructions being executable by a computer to cause the computer to:
- receive, at a server, a request from an endpoint device for requested data, wherein the request includes one or more contextual attributes of the endpoint device including an identity of a user of the endpoint device;
- process the one or more contextual attributes and authenticating the identity of the user to determine that the endpoint device is authorized to receive the requested data;
- determine a security policy for the requested data based on the one or more contextual attributes; and
- transmit, by the server, the requested data including the determined security policy to the endpoint device, wherein responsive to receiving the requested data, the endpoint device enforces the security policy to selectively permit access to the received data by La preventing the endpoint device from displaying the received data to an unauthorized individual and (ii) locally caching the received data on the endpoint device.

16. The one or more non-transitory computer readable storage media of claim 15, wherein the program instructions to prevent the endpoint device from displaying the received data to an unauthorized user cause the computer to:
- identify the unauthorized user using facial recognition; and
- modify a user interface of the endpoint device in which the received data is displayed to blur or hide the data that is displayed.

17. The one or more non-transitory computer readable storage media of claim 15, wherein the security policy for the received data is further determined based on metadata that is associated with the received data, wherein the metadata indicates a security level of the received data.

18. The one or more non-transitory computer readable storage media of claim 15, wherein the one or more contextual attributes include a location of the endpoint device.

19. The one or more non-transitory computer readable storage media of claim 15, wherein the security policy prevents unauthorized access to the received data for a predetermined amount of time.

20. The one or more non-transitory computer readable storage media of claim 15, wherein the received data includes audio data, and wherein selectively permitting access to the received data further includes disabling playback of the audio data.

* * * * *

UNITED STATES PATENT AND TRADEMARK OFFICE
CERTIFICATE OF CORRECTION

| | |
|---|---|
| PATENT NO. | : 11,818,137 B2 |
| APPLICATION NO. | : 17/490004 |
| DATED | : November 14, 2023 |
| INVENTOR(S) | : Nagendra Kumar Nainar et al. |

It is certified that error appears in the above-identified patent and that said Letters Patent is hereby corrected as shown below:

In the Claims

Claim 8, Column 18, Line 40, please replace "permit access to the received data by La" with --permit access to the received data by (i)--

Claim 15, Column 19, Line 23, please replace "permit access to the received data by La" with --permit access to the received data by (i)--

Signed and Sealed this
Twenty-seventh Day of February, 2024

Katherine Kelly Vidal
*Director of the United States Patent and Trademark Office*